United States Patent [19]
Liu et al.

[11] Patent Number: 6,049,864
[45] Date of Patent: *Apr. 11, 2000

[54] METHOD FOR SCHEDULING A FLAG GENERATING INSTRUCTION AND A SUBSEQUENT INSTRUCTION BY EXECUTING THE FLAG GENERATING INSTRUCTION IN A MICROPROCESSOR

[75] Inventors: Kin-Yip Liu, Millbrae; Ken Shoemaker, Los Altos Hills; Gary Hammond, Campbell; Anand Pai, San Jose; Krishna Yellamilli, Cupertino, all of Calif.

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/699,910

[22] Filed: Aug. 20, 1996

[51] Int. Cl.[7] .................................. G06F 9/40; G06F 9/38
[52] U.S. Cl. .......................... 712/214; 712/215; 712/216; 712/221; 712/223; 712/23; 712/32; 712/41; 712/245
[58] Field of Search ...................... 395/376–394, 395/561, 564, 566, 567, 800.23, 800.41, 800.42, 800.32; 712/200, 214–216, 220–221, 223, 226, 245, 23, 32, 41

[56] References Cited

U.S. PATENT DOCUMENTS

| | | | |
|---|---|---|---|
| 3,711,692 | 1/1973 | Batcher | 708/210 |
| 4,161,784 | 7/1979 | Cushing et al. | 712/222 |
| 4,189,716 | 2/1980 | Krambeck | 708/210 |
| 4,371,951 | 2/1983 | Kort et al. | 395/800.02 |
| 4,393,468 | 7/1983 | New | 708/518 |
| 4,418,383 | 11/1983 | Doyle et al. | 710/127 |
| 4,435,753 | 3/1984 | Rizzi | 395/709 |
| 4,486,848 | 12/1984 | Kaminski | 708/210 |
| 4,498,177 | 2/1985 | Larson | 708/210 |
| 4,567,574 | 1/1986 | Saadé et al. | 395/709 |
| 4,630,192 | 12/1986 | Wassel et al. | 708/210 |

(List continued on next page.)

FOREIGN PATENT DOCUMENTS

318957A3  6/1989  European Pat. Off. .......... G06F 5/00

OTHER PUBLICATIONS

MC88110 Second Generation Risc Microprocessor User's Manual, Motorola, pp. 1–23, date unknown.
MC88110 Errata to Second Generation Risc Microprocessor User's Manual, Motorola, pp. 1–11, Sep. 22, 1992.
MC88110 User'Manual Index, Motorola, date unknown.
MC88110PRG Programmer's Reference Guide, Motorola, pp. 1–4, Dec. 1992.
MC88110 User's Manual, Section 2 Programming Model, Motorola, pp. 1–20, date unknown.
MC88110 User's Manual, Section 3 Addressing Modes and Instruction Set Summary, Motorola, pp. 1–32, date unknown.
MC88110 User's Manual, Section 5 Graphics Unit Implementation, Motorola, pp. 1–26, date unknown.
MC88110 User's Manual Padd Pixel Add, Section 10, pp. 62–71, date unknown.

(List continued on next page.)

*Primary Examiner*—Zarni Maung
*Assistant Examiner*—Bharat Barot
*Attorney, Agent, or Firm*—Blakely, Sokoloff, Taylor & Zafman LLP

[57] ABSTRACT

A method for scheduling a flag generating instruction and a subsequent instruction. The subsequent instruction has a data dependency on the flag generating instruction. The flag generating instruction is translated into first and second instructions. The subsequent instruction is translated into at least a third instruction. The first instruction, when executed, generates a result and intermediate flag generation data. The second instruction, when executed, generates a plurality of flags. The first instruction is scheduled to execute before the second and third instructions. The second instruction is scheduled to execute before the third instruction if the third instruction has a data dependency on the second instruction, otherwise the third instruction may be scheduled to execute before the second instruction.

19 Claims, 4 Drawing Sheets

U.S. PATENT DOCUMENTS

| | | | |
|---|---|---|---|
| 4,656,582 | 4/1987 | Chaitin et al. | 395/707 |
| 4,656,583 | 4/1987 | Auslander et al. | 395/709 |
| 4,707,800 | 11/1987 | Montrone et al. | 708/714 |
| 4,710,872 | 12/1987 | Scarborough | 395/707 |
| 4,773,007 | 9/1988 | Kanada et al. | 395/704 |
| 4,782,444 | 11/1988 | Munshi et al. | 395/709 |
| 4,785,393 | 11/1988 | Chu et al. | 712/223 |
| 4,785,421 | 11/1988 | Takahashi et al. | 708/205 |
| 4,821,181 | 4/1989 | Iwasawa et al. | 345/500 |
| 4,833,606 | 5/1989 | Iwasawa et al. | 345/709 |
| 4,885,684 | 12/1989 | Austin et al. | 709/105 |
| 4,901,270 | 2/1990 | Galbi et al. | 708/708 |
| 4,965,724 | 10/1990 | Utsumi et al. | 395/707 |
| 4,989,168 | 1/1991 | Kuroda et al. | 708/216 |
| 5,201,056 | 4/1993 | Daniel et al. | 712/221 |
| 5,321,820 | 6/1994 | Nakajima | 395/586 |
| 5,339,447 | 8/1994 | Balmer | 708/210 |
| 5,404,552 | 4/1995 | Ikenaga | 395/800.41 |
| 5,418,736 | 5/1995 | Widigen et al. | 708/785 |
| 5,541,865 | 7/1996 | Ashkenzai | 708/210 |
| 5,555,432 | 9/1996 | Hinton et al. | 395/800.23 |
| 5,590,359 | 12/1996 | Sharangpani | 395/800.32 |
| 5,613,080 | 3/1997 | Ray et al. | 395/390 |
| 5,632,023 | 5/1997 | White et al. | 395/394 |

OTHER PUBLICATIONS

SPARC Technology, Ultra SPARC Multimedia Capabilities On–Chip Support for Real–Time Video and Advanced Graphics, pp. 1–8, Sep., 1994.

Case, TriMedia Processors Aimed at Future Multimedia Embedded App, pp. 12–18 (1994).

Gwennap, HP's PA–7100LC Uses New Instructions to Eliminate Decoder Chip, pp. 16–17 (1994).

U.S. Patent Application entitled, "Method and Apparatus Using Novel Operations in a Processor" Inventors: Peleg et al. Filed: Dec. 30, 1993.

U.S. Patent Application entitled, "Apparatus for Providing a Two–Instruction Implementation of a Population Count Function" Inventors: Dreyer et al., Filed: Dec. 29, 1995.

| O | S | Z | A | P | C |

An Arithmetic Flags Register (AFLAGS)

FIG. 1A

| ID | Flag Name | Description |
|----|-----------|-------------|
| C | Carry | Carry indicates a carry after addition or a borrow after subtraction. The carry flag also indicates error conditions in some programs and procedures. |
| P | Parity | Parity is a count of the number of logic 1s in a number and is expressed as even or odd. Parity is a logic 0 for odd parity and a logic 1 for even parity. |
| A | Auxiliary Carry | Auxiliary Carry holds a carry after addition or a borrow after subtraction between bits positions 3 and 4 of the result. |
| Z | Zero | Zero indicates that the result of an arithmetic or logic operation is zero. |
| S | Sign | Sign indicates the arithmetic sign of the result after an addition or subtraction. |
| O | Overflow | Overflow is a condition that occurs when signed numbers are added or subtracted. An overflow indicates that the result has exceeded the capacity of the microprocessor. |

Descriptions of the Arithmetic Flags contained in AFLAGS

FIG. 1B

Format: prodf AFLAGS = X1, mode, opsize
Operation: switch (opsize) {
    case 8-bit:
        top_bit_pos = 7;
        carry_pos = 34;
        break;
    case 16-bit:
        top_bit_pos = 15;
        carry_pos = 36;
        break;
    case 32-bit:
        top_bit_pos = 31;
        carry_pos = 38;
        break;}

FIG. 4 switch (mode) {
    case ADDF: /*00*/
        AFLAGS.aux = X1{32};
        AFLAGS.carry = X1{carry_pos});
        AFLAGS.overf = X1{carry_pos} ^ X1(carry_pos-1};
        break;
    case SUBF: /*01*/
        AFLAGS.aux = ~(X1{32});
        AFLAGS.carry = ~(X1{carry_pos});
        AFLAGS.overf = X1{carry_pos} ^ X1(carry_pos-1};
        break;
    case shiftl: /*10*/
        /* left shifts/rotates;
        AFLAGS.carry = X1{top_bit_pos + 1};
        AFLAGS.overf = AFLAGS.carry ^ X1 {top_bit_pos};
        break;
    case shiftr: /*11*/
        /* right shifts/rotates */
        AFLAGS.carry = X1{top_bit_pos + 1};
        AFLAGS.overf = X1 {top_bit_pos-1} ^ X1 {top_bit_pos};
        break; }

AFLAGS.parity = has_even_parity (X1{7:0});
    AFLAGS.sign = X1 {top_bit_pos};
    AFLAGS.zero = (X1{top_bit_pos:0} == 0);

METHOD FOR SCHEDULING A FLAG GENERATING INSTRUCTION AND A SUBSEQUENT INSTRUCTION BY EXECUTING THE FLAG GENERATING INSTRUCTION IN A MICROPROCESSOR

BACKGROUND OF THE INVENTION

This invention relates to a method for executing a flag generating instruction and a subsequent instruction. This method is particularly useful for rapidly executing flag generating CISC instructions such as Intel x86 instructions.

When many computer languages that are in widespread use today were developed, memory was a very expensive commodity. In addition, during the development of the early microprocessors, instructions took a long time to fetch when compared with the time needed to execute. Thus, the language developers needed to ensure that instructions could be stored compactly. As a result, they developed computer languages that contained a very rich vocabulary of computer operations. A microprocessor that executes these operations is known as a complex instruction set computer (CISC). While CISC microprocessors can rapidly handle CISC instructions, such microprocessors are often more complex, expensive, and often slower than a microprocessor designed to handle simpler instructions.

Today, because memory is relatively inexpensive, modem computer languages emphasize speed of execution rather than compactness of code. Thus, more modern reduced instruction set computer (RISC) languages utilize a smaller number of simple instructions that may be rapidly handled by a RISC microprocessor. One of the primary reasons that RISC instructions may be handled faster than CISC instructions is that RISC instructions are easier to schedule and execute in parallel than CISC instructions. A microprocessor that can execute instructions in parallel is known as a superscalar microprocessor.

Most microprocessor instructions generate at least one result that is utilized by subsequent instructions. If a subsequent instruction utilizes a result produced by a previous instruction, the subsequent instruction is said to have a data dependency on the previous instruction. Thus, if a superscalar microprocessor attempts to execute the two instructions at the same time, the execution of the subsequent instruction must wait until the previous instruction has produced its result. Typically, any instruction must be delayed until all of its inputs have been produced. This requirement places a significant performance limitation on superscalar microprocessors.

The above described execution, known as out-of-order execution, is a conventional method to significantly increase the performance of modem microprocessors. It is known in the art that RISC instructions can be more easily executed out-of-order than their CISC counterparts.

In an effort to ensure compatibility with older CISC software, the vast majority of computer programmers still use CISC instructions today. However, in an effort to take advantage of the RISC performance enhancements, some microprocessor designers break down lengthy CISC instructions into simpler operations that more closely resemble RISC instructions.

When a CISC arithmetic instruction, such as ADD X1=X2+X3 executes, it generates a result equal to X2+X3. X2 and X3 are known as operands. In addition, the arithmetic instruction generates several flags. CISC logical instructions such as AND, OR, and XOR, also generate similar flags.

A flag is a bit that may indicate the condition of a microprocessor. A flag may also control the operation of the microprocessor. Flags are typically grouped together into a flag register. For example, a microprocessor could group arithmetic flags into the AFLAGS register as shown in FIG. 1(a). Descriptions of these arithmetic flags are shown in FIG. 1(b).

The arithmetic portion of the above CISC arithmetic instruction efficiently translates into a single RISC instruction or at least a relatively small number of RISC instructions. However, the flag generation portion conventionally translates into many RISC instructions. Numerous instructions are required because of the complexity of flag generation. As an example, the previously discussed ADD instruction could modify the contents of the sign, zero, carry, auxiliary carry, parity, and overflow flags. As a result of the large number of RISC instructions necessary to generate the above flags, the performance of the microprocessor decreases dramatically. Thus, translating CISC flag generating arithmetic instructions into RISC instructions is not an optimal solution.

There is a need for a more efficient method to execute flag generating arithmetic and logic instructions. Such a method should avoid the expense, complexity, and slow speed of CISC microprocessors. In addition, such a method should take advantage of RISC performance enhancements while avoiding generating a large number of RISC instructions that decrease performance.

2. SUMMARY OF THE INVENTION

The invention relates to a method, performed by a microprocessor, for scheduling a flag generating instruction and a subsequent instruction. The subsequent instruction has a data dependency on the flag generating instruction. The flag generating instruction is translated into first and second instructions. The subsequent instruction is translated into at least a third instruction.

The first instruction, when executed, generates a result and intermediate flag generation data. The second instruction, when executed, generates a plurality of flags.

The first instruction is scheduled to execute before the second and third instructions. The second instruction is scheduled to execute before the third instruction if the third instruction has a data dependency on the second instruction, otherwise the third instruction may be scheduled to execute before the second instruction.

3. BRIEF DESCRIPTION OF THE DRAWINGS

FIG. 1(a) is a diagram of an AFLAGS register.

FIG. 1(b) is a table containing a description of flags contained in the AFLAGS register of FIG. 1(a).

FIG. 4 presents pseudo code for a prodf instruction.

Figure 2:
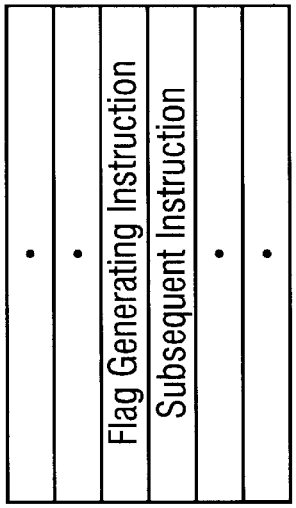
FIG. 2 is a diagram of a plurality of computer instructions.
Figure 5:
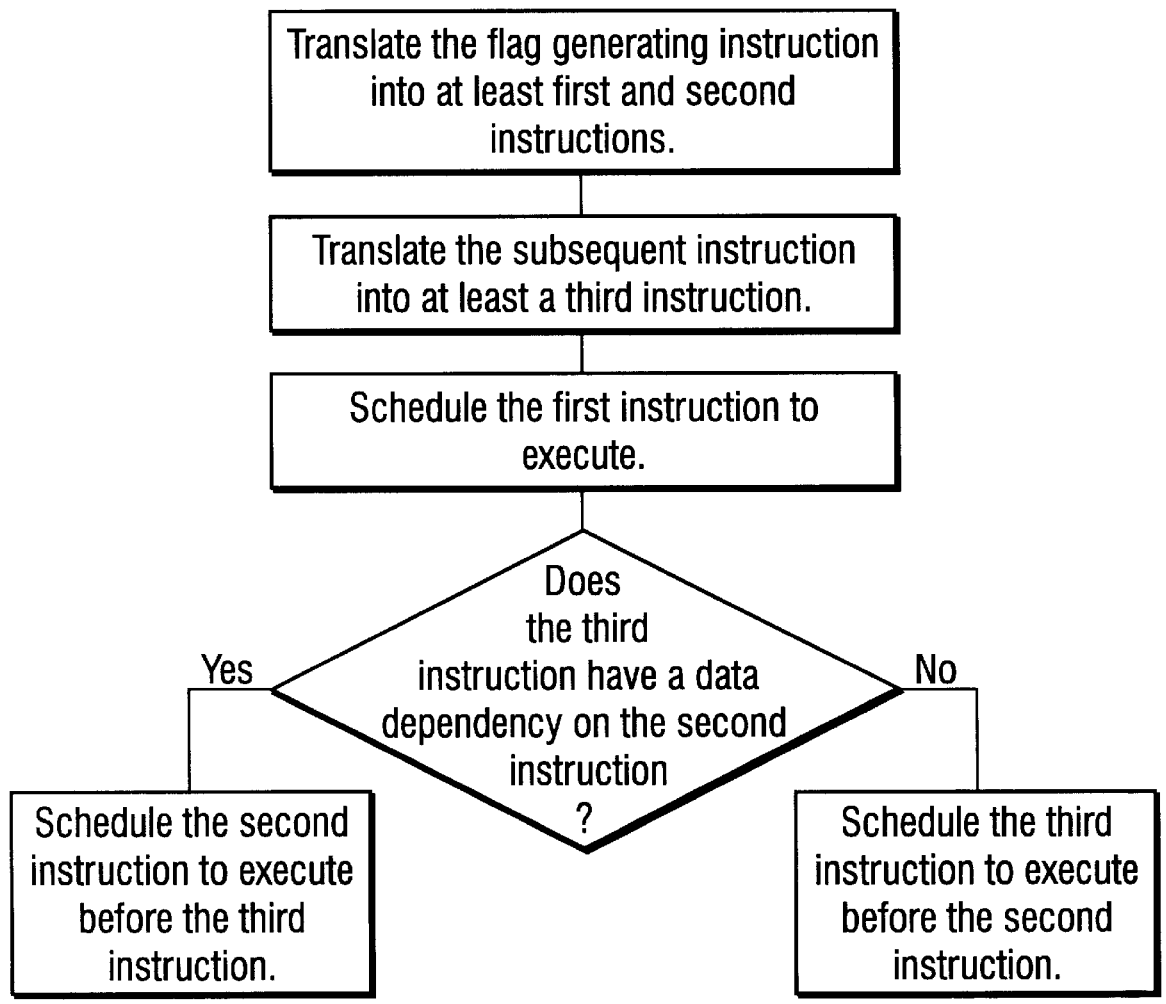

FIG. 5 is a high level diagram of a method for executing the flag generating and subsequent instructions of FIG. 2.

4. DETAILED DESCRIPTION OF SPECIFIC EMBODIMENTS

Referring to FIG. 2, a plurality of instructions is shown. The plurality of instructions are typically CISC instructions, although they may be RISC instructions.

The plurality of instructions include at least one flag generating instruction and a subsequent instruction. The flag generating instruction may be any instruction that generates at least one flag. Examples of flag generating arithmetic instructions include add, subtract, shift left, and shift right. Examples of flag generating logical instructions include instructions that perform the logical operations AND, OR, and XOR.

The subsequent instruction has a data dependency on the flag generating instruction. Thus, the subsequent instruction may take the result and/or a flag generated by the flag generating instruction as an input.

While only two instructions are shown in FIG. 2, it is to be understood that the two instructions are part of a larger computer program consisting of numerous instructions. In addition, even though the subsequent instruction is shown as immediately following the flag generating instruction, there may be additional instructions between the flag generating instruction and the subsequent instruction.

4.1 Translating the flag generating instruction

Figure 3:
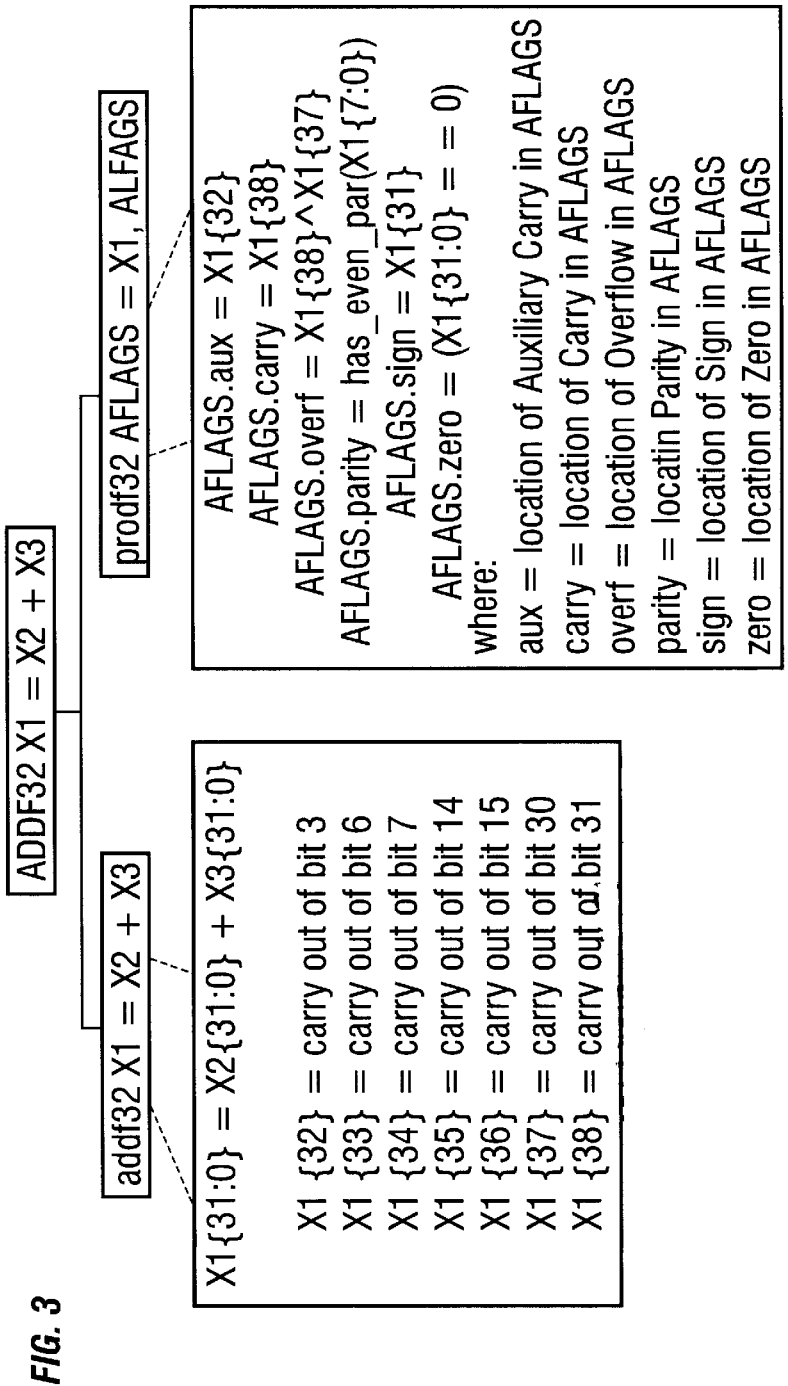
FIG. 3 is a high level diagram of one embodiment of a method to translate a flag generating instruction.

Referring to FIG. 3, a method to execute the instructions shown in FIG. 2 is presented. A flag generating instruction, such as a 32 bit add instruction (ADD32), is translated into a first instruction (addf32) and a second instruction (prodf32). The first and second instructions are typically RISC instructions, however, under some circumstances, they may be CISC instructions. (In an effort to facilitate readability, all CISC instructions will be upper case and all RISC instructions will be lower case.) While the terms "first" and "second" are used to describe the above two instructions, there may be additional instructions generated from the flag generating instruction. In addition, there may be additional instructions generated between the generation of the first and second instructions.

Referring again to FIG. 3, ADD32 X1=X2+X3 is intended to place the sum of the two 32 bit operands X2 and X3 into register X1. Further, ADD32 is intended to update some or all of the 6 arithmetic flags in the AFLAGS register of FIG. 1(a). ADD32 X1=X2+X3 may be broken down into two RISC instructions. Addf32 generates the arithmetic result X2+X3. In addition, addf32 produces intermediate flag generation data such as carry out bits or other bits that may be utilized in producing flags. Prodf32 produces the arithmetic flags using the intermediate flag generation data produced by addf32.

4.1.1 addf32

As shown in FIG. 3, addf32 places the arithmetic result X2+X3 into the lower 32 bits of X1. Note that both X2 and X3 are 32 bit numbers. However, the registers that hold X1, X2, and X3 may be greater than 32 bits in length. A length of 64 bits may be optimal. If 64 bit registers are used, then the upper 32 bits may be used to store intermediate flag generation data and flags while the lower 32 bits may be used to store the above arithmetic result. Referring again to FIG. 3, the various carry out bits may be placed into the higher order bits of X1. Alternatively, the carry out bits may be placed in any memory storage location, such as another general purpose register. However, placing the arithmetic result, intermediate flag generation data, and even AFLAGS in a single register may be useful in certain circumstances such as data dependency checking.

4.1.2 prodf32

As shown in FIG. 3, the prodf32 instruction produces six arithmetic flags by performing conventional operations on the intermediate flag generation data. Because prodf32 takes the intermediate flag generation data as an input, prodf32 is data dependent on add32. In the embodiment shown in FIG. 3, prodf32 sets the Auxiliary Carry flag to the value of X1{32}. X1{32} contains the value of the carry out of bit 3.

Similarly, prodf32 sets the Carry flag to the value of X1{38}, the carry out of bit 31. The Overflow flag is set to the result of X1{38} XOR X1{37}. X1{37} contains the value of the carry out of bit 30. The Parity flag is set if the first 8 bits in X1 have even parity. Similarly, the Zero flag is set if the first 32 bits of X1 are equal to zero.

As is known by those skilled in the art, flag generation depends on both the operand size and the flag generating instruction. Thus, different versions of prodf may be needed for the differing operand sizes and differing flag generating instructions. FIG. 4 presents C pseudo code for a prodf instruction that supports operand sizes of 8, 16, and 32 bits. This C pseudo code also supports several different flag generating instructions.

There may be circumstances when a designer would desire to keep some of the flags unchanged. For example, in an effort to maintain compatibility with certain Intel x86 CISC instructions, some instructions may be allowed to modify only a subset of the flags. In this case, flags that the instruction should not modify could be masked. Thus, prodf could take an AFLAGS mask as an additional input. Prodf could then generate a temporary AFLAGS, check the given AFLAGS mask, and merge the temporary and original AFLAGS together to form the final AFLAGS.

4.2 Translating the subsequent instruction

Referring to FIG. 5, after the flag generating instruction is translated into first and second instructions, the subsequent instruction is translated into one or more instructions. Typically these instructions are RISC instructions. One of these RISC instructions will be referred to as a third instruction. Recall that the subsequent instruction is data dependent on the flag generating instruction. Thus, the third instruction is data dependent on either the first and/or the second instructions.

4.3 Scheduling the first instruction

As discussed previously, the second instruction takes the result generated by the first instruction as an input. Similarly, the third instruction takes the result of the first instruction and/or a flag generated by the second instruction as an input. Thus, because the second and third instructions are data dependent on at least the first instruction, the first instruction is scheduled to execute first by the microprocessor instruction scheduler.

4.4 Scheduling the second and third instructions

Again referring to FIG. 5, the third instruction may or may not take the flags generated by the second instruction as an input. If the third instruction does take the flags as an input, then the third instruction is data dependent on the second instruction. Thus, the second instruction is scheduled to execute prior to the third instruction. However, if the third instruction is not data dependent on the second instruction, then an increase in performance may be obtained. In this case, the third instruction may be scheduled to execute before the second instruction.

4.5 Storage of certain flag combinations

When determining a conditional branch, a microprocessor may often use certain combinations of some of the bits in AFLAGS. Some examples of these combinations are "below or equal" (Carry OR Zero), "less" (Sign XOR Overflow), "less or equal" ((Sign XOR Overflow) OR Zero), and the complements of these cases. In an effort to increase microprocessor performance, the values for each of these combinations may be produced by prodf and stored in the AFLAGS register. If the combinations are so stored, then many branch decisions may be made by testing only one bit.

5. REMARKS

One of the advantages of the invention is that it provides an efficient method for executing flag generating instructions. By breaking such instructions into a small number of instructions, subsequent instructions may be expedited if they do not take flags as an input. In addition, by breaking such instructions into only a small number of instructions, the invention avoids the large number of instructions that are generated by conventional CISC to RISC translations.

Another advantage of the invention is that it allows some arithmetic instructions to be executed in a single clock cycle in a modern microprocessor. For example, it may not be possible to execute a CISC ADD32 instruction in a single clock cycle of a modern microprocessor. However, it would be possible to execute a RISC add32 in a single instruction cycle.

Another advantage of breaking CISC flag generating arithmetic instructions into RISC instructions, is that it simplifies the design effort. It is known by those skilled in the art that designing two separate modules often requires less effort than designing a single complex module.

Still another primary advantage of this invention is that it decreases the complexity of a microprocessor. CISC microprocessors are inherently complex. However, by breaking down CISC flag generating instructions into more manageable RISC instructions, CISC instructions can be efficiently executed using RISC performance enhancements.

It will be appreciated by those of ordinary skill having the benefit of this disclosure that the illustrative embodiments described above are capable of numerous variations without departing from the scope and spirit of the invention. For example, while an ADD32 instruction has been discussed as an example of a flag generating instruction, other ADD instructions that operate on different length operands are also flag generating instructions. There are many other flag generating instructions, such as but not limited to subtract, left shift, right shift, and logical instructions. Accordingly, the exclusive rights sought to be patented are as described in the claims below.

What is claimed is:

1. A method, performed by a microprocessor, for executing a flag generating instruction, the method comprising:
   (a) translating the flag generating instruction into at least a first instruction and a second instruction;
   (b) the first instruction generating intermediate flag generation data upon execution of the first instruction; and
   (c) the second instruction, utilizing the intermediate flag generation data, generating a plurality of flags upon execution of the second instruction.

2. The method of claim 1, further comprising scheduling the first instruction for execution before the second instruction.

3. The method of claim 1 wherein the flag generating instruction comprises a CISC instruction and the first and second instructions comprise RISC instructions.

4. The method of claim 1 wherein the flag generating instruction comprises an Intel x86 instruction.

5. The method of claim 1 wherein the flag generating instruction comprises an arithmetic instruction.

6. The method of claim 1 wherein the flag generating instruction comprises a logical instruction.

7. The method of claim 1 wherein the microprocessor comprises a superscalar out-of-order microprocessor.

8. A method, performed by a microprocessor, for scheduling a flag generating instruction and a subsequent instruction, the subsequent instruction having a data dependency on the flag generating instruction, the method comprising:
   (a) translating the flag generating instruction into a first instruction and a second instruction, the first instruction, when executed, generating intermediate flag generation data, the second instruction, when executed, utilizing the intermediate flag generation data, generating a plurality of flags;
   (b) translating the subsequent instruction into at least a third instruction;
   (c) scheduling the first instruction to execute before the second and third instructions; and
   (d) scheduling the second instruction to execute before the third instruction if the third instruction has a data dependency on the second instruction.

9. The method of claim 8 wherein the flag generating instruction and the subsequent instruction comprise CISC instructions and the first, second, and third instructions comprise RISC instructions.

10. The method of claim 8 wherein the flag generating instruction comprises an arithmetic instruction.

11. The method of claim 8 wherein the flag generating instruction comprises a logical instruction.

12. The method of claim 8 wherein the flag generating instruction and the subsequent instruction comprise Intel x86 instructions.

13. The method of claim 8 wherein the microprocessor is a superscalar out-of-order microprocessor.

14. A method, performed by a microprocessor, for scheduling a flag generating instruction and a subsequent instruction, the subsequent instruction having a data dependency on the flag generating instruction, the method comprising:
   (a) translating the flag generating instruction into a first instruction and a second instruction, the first instruction, when executed, generating intermediate flag generation data, the second instruction, when executed, utilizing the intermediate flag generation data, generating a plurality of flags;
   (b) translating the subsequent instruction into at least a third instruction;
   (c) scheduling the first instruction to execute before the second and third instructions;
   (d) scheduling the second instruction to execute before the third instruction if the third instruction has a data dependency on the second instruction; and
   (e) otherwise, scheduling the third instruction to execute before the second instruction.

15. The method of claim 14 wherein the flag generating instruction and the subsequent instruction comprise CISC instructions and the first, second, and third instructions comprise RISC instructions.

16. The method of claim 14 wherein the flag generating instruction comprises an arithmetic instruction.

17. The method of claim 14 wherein the flag generating instruction comprises a logical instruction.

18. The method of claim 14 wherein the flag generating instruction and the subsequent instruction comprise Intel x86 instructions.

19. The method of claim 14 wherein the microprocessor is a superscalar out-of-order microprocessor.

* * * * *

UNITED STATES PATENT AND TRADEMARK OFFICE
CERTIFICATE OF CORRECTION

PATENT NO. : 6,049,864
DATED : April 11, 2000
INVENTOR(S) : Liu et al.

It is certified that error appears in the above-identified patent and that said Letters Patent is hereby corrected as shown below:

In column 1, at line 26, delete "modem" and insert --modern--.

Signed and Sealed this

Fifteenth Day of May, 2001

Attest:

NICHOLAS P. GODICI

*Attesting Officer*     *Acting Director of the United States Patent and Trademark Office*